J. W. ASHBAUGH.
COMBINATION GAS VALVE.
APPLICATION FILED MAY 11, 1911. RENEWED SEPT. 15, 1913.
1,093,026.
Patented Apr. 14, 1914.
2 SHEETS—SHEET 1.
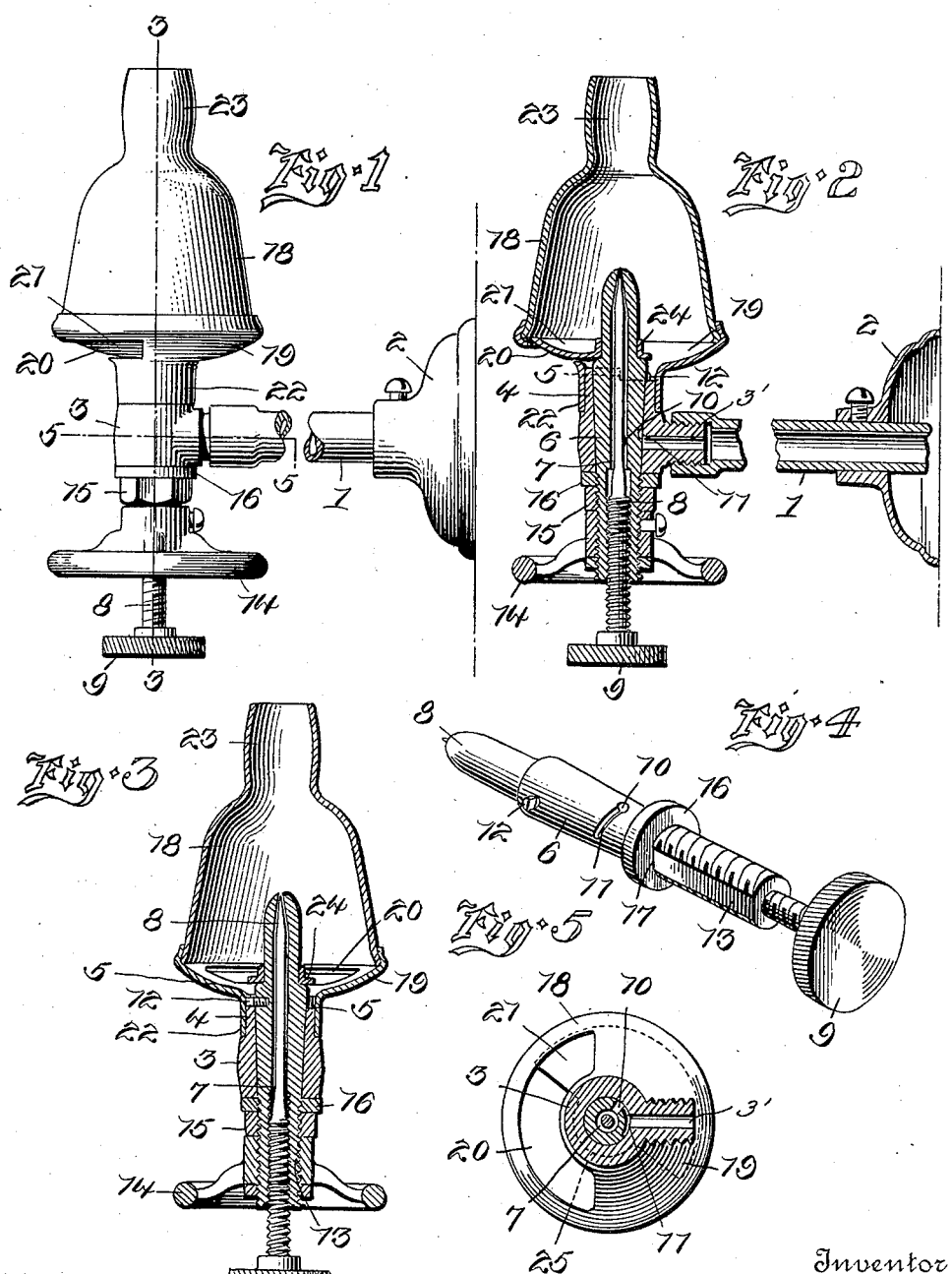
Witnesses
Inventor
James W. Ashbaugh.
by Attorneys

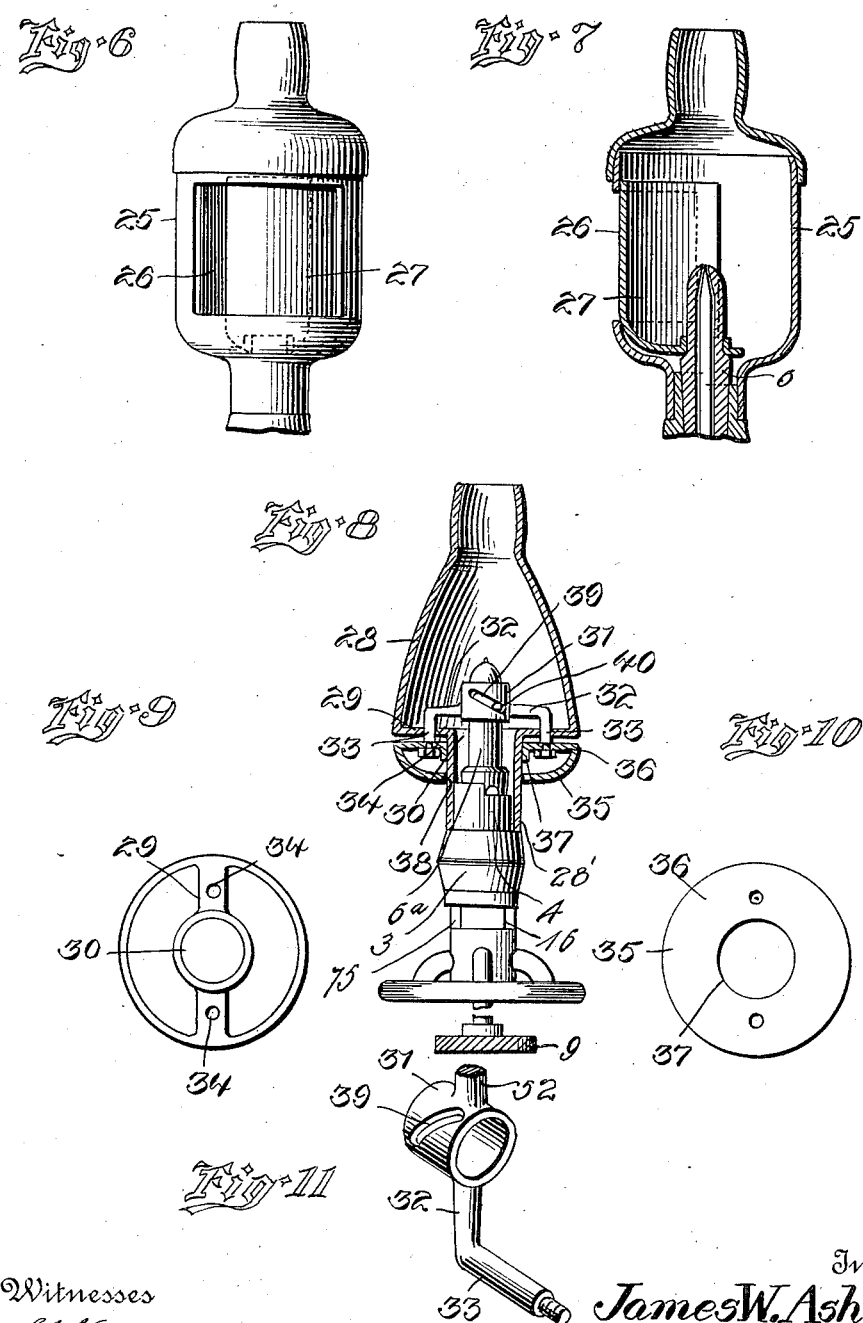

UNITED STATES PATENT OFFICE.

JAMES W. ASHBAUGH, OF BREMEN, OHIO.

COMBINATION GAS-VALVE.

1,093,026.   Specification of Letters Patent.   Patented Apr. 14, 1914.

Application filed May 11, 1911, Serial No. 626,472.   Renewed September 15, 1913.   Serial No. 789,893.

*To all whom it may concern:*

Be it known that I, JAMES W. ASHBAUGH, a citizen of the United States, residing at Bremen, in the county of Fairfield and State of Ohio, have invented certain new and useful Improvements in Combination Gas-Valves; and I do declare the following to be a full, clear, and exact description of the invention, such as will enable others skilled in the art to which it appertains to make and use the same.

This invention relates to improvements in gas feed valves and more particularly to a combined feed valve, mixer and regulator for gas burners.

The invention is designed as an improvement over the patented device shown in Patent No. 852,591, issued May 7, 1907, to James W. Ashbaugh.

The object of the invention is to construct a simple, cheap, and practical burner of this class whereby the gas and air will be so regulated as to obtain the strongest combination of heat or illumination according to the burner to which it is applied, it being especially adapted for use on burners for gas heaters, carbureters, or the like.

Another object of the invention is to provide a gas controlling and mixing valve whereby the quantity of air adapted for mixing with the gas is automatically increased and diminished as the supply of gas is increased and diminished, the air and gas being turned on and off simultaneously by a single operation.

Another object of the invention is to provide a rotary valve having means whereby the gas is gradually turned off and on.

In the accompanying drawings, Figure 1 is a side elevation of this improved valve; Fig. 2 is a longitudinal vertical section thereof; Fig. 3 is a transverse vertical section taken on the line 3—3 of Fig. 1; Fig. 4 is a perspective view of the valve plug detached; Fig. 5 is a horizontal section taken on the line 5—5 of Fig. 1; Fig. 6 is a side elevation of a mixing chamber showing a slightly modified form of air controlling shutter; Fig. 7 is a longitudinal section thereof; Fig. 8 is a similar view showing another form of shutter and the manner of mounting it; Fig. 9 is an end view of the mixing chamber shown in Fig. 8; Fig. 10 is a similar view of the shutter shown in Fig. 8; Fig. 11 is a detail perspective view of the means for connecting this shutter with the valve plug.

In the embodiment illustrated in Figs. 1 to 5, a hollow gas pipe 1 is provided at one end with the ordinary collar 2 for connection with the wall or other support. Threaded upon the other end of the tube or pipe 1 is a tubular socket or fitting 3 having a small aperture 3′ in one wall thereof which communicates with the bore of the tube 1 for the passage of gas therethrough. One end of this socket or fitting 3 has a tubular extension 4, one-half, more or less, of the free end of which is cut away to form oppositely disposed shoulders, as 5, for engagement by a stop pin formed on the valve plug to be described. The valve plug 6 is preferably constructed as shown in detail in Fig. 4 having a bore 7 extending therethrough for the reception of a needle valve 8, the stem of which is threaded and engages threads at the outer end of the bore 7 whereby said needle valve may be adjusted within the bore of the valve plug 6. Any suitable means may be provided for operating this needle valve such as a milled button or thumb nut 9, the inner end of the valve 6 is preferably reduced and shouldered at the base thereof, which is adapted to engage an air controlling shutter hereinafter described. An aperture 10 extends through one wall of the plug 6 preferably about midway the length thereof and is designed to register with the small opening 3′ in the fitting 3 when the plug is turned in one direction to permit the passage of gas from said pipe 1 into said plug 6. A groove 11 of any suitable shape is arranged helically in the outer face of the plug 6 and communicates at one end with the aperture 10 therein and preferably decreases in depth toward its outer end to provide for the gradual turning on and cutting off of the gas to be supplied to or cut off from the burner. A stop pin 12 projects laterally from the inner end of the plug 6 adjacent the reduced portion thereof and when the parts are assembled is designed to engage the shoulders 5 for limiting the turning of said plug in opposite directions. The outer end of this plug 6 is preferably exteriorly screw threaded and has one face thereof flattened as shown at 13, said flattened face being designed to receive an operating handle as 14 by means of which the plug may be turned in the fitting 3. The plug 6 is operatively mounted in the fitting 3 and held in position by a nut 15 which engages the screw threaded end of said plug and a washer 16 is preferably arranged between the end of the fitting and the nut, the opening in said washer being provided with a flattened face 17 for engagement with the flat face 13 of the plug which prevents said washer from turning on said plug. The peculiar mounting above described disposes the valve plug 6 in a plane at right angles to the tube or pipe 1 through which gas is admitted to the valve. It will thus be obvious that the gas enters at one side of the plug 6 and is discharged through one end thereof, the amount passing therethrough being controlled by the needle valve 8.

A mixing chamber 18 is mounted on the tubular extension 4 of the fitting 3 and is preferably constructed as shown in the form of a hollow truncated cone, the base of which is provided with a closure 19 having a segmental opening 20 therein over which a shutter 21 is designed to operate for varying the size of said opening. This closure 19 is also provided with a centrally disposed opening having an outwardly extending annular flange 22 surrounding it which telescopically engages the extension 4 of the fitting 3 and is secured thereon by friction or in any other suitable manner. The apex of this hollow truncated cone-shaped mixing chamber is also provided with a centrally disposed opening surrounded by an outwardly projecting annular flange 23, which is adapted to be engaged with a burner (not shown). The shutter 21 is preferably constructed as shown in the form of a semi-circular plate having a centrally disposed extension 24 on its straight edge which is apertured to receive the reduced end of the valve plug and which may be fixed thereto by any suitable means, said shutter being adapted to turn with the plug 6 for opening and closing the segmental opening 20 in the mixing chamber or for varying the size of said opening to permit more or less air to enter said chamber according to the amount of gas admitted by the valve.

In Figs. 6 and 7, the mixing chamber 25 is shown cylindrical in form and with an opening 26 in one side wall. This opening 26 is controlled by a rotary semi-cylindrical shutter 27 secured to the end of the plug 6 which projects into the mixing chamber. This shutter 27 is operated in the same manner as the shutter 21 on the turning of the plug to enlarge or decrease the size of the opening 26 to permit more or less air to enter the mixing chamber through said opening according to the amount of gas admitted through the plug.

In Figs. 8 to 11 the mixing chamber 28, which is mounted on the fitting 3, is substantially truncated cone-shaped, is open at its lower larger end and provided with a cross bar 29 having a central aperture 30 through which the plug 6′ passes, and provided with a tubular stem 28′ which fits tightly on the fitting 3. A collar 31 is secured to the reduced end of the valve plug 6′ by suitable means hereinafter described, and said collar is provided with laterally extending arms as 32 provided with right angularly disposed parallel extensions, as 33. These extensions 33 are designed to pass through openings, as 34, in the cross bar 29 and are engaged with an air controlling shutter 35. This shutter 35 is mounted to move longitudinally and is preferably constructed as shown in Figs. 8 and 10 in the form of a hollow member having a rounded or curved lower wall and a plate or closure 36 arranged to form a flat end, said plate having a centrally disposed flanged aperture 37 which fits loosely over the stem 28′ of the chamber 28. The oppositely disposed curved wall of this shutter is also provided with an aperture 38 which fits loosely over the said stem 28′. The extensions 33 of the arms 32 are engaged with the plate 36 by nuts or other suitable means. The collar 31 has an obliquely disposed or helical slot 39 therein with which is engaged a pin 40 which projects laterally from the reduced end of the plug 6′ and when said plug is turned, said collar is moved inwardly or outwardly according to the direction in which the plug is rotated and thereby moves the shutter 35 toward or away from the mixing chamber to vary the amount of air admitted to said chamber.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

I claim as my invention:—

1. In combination with a gas supply pipe having a tubular fitting at one end thereof with the bore of said fitting in a plane at right angles with the bore of said pipe, said fitting having an aperture in one wall communicating with the bore of said pipe, a hollow rotary valve plug mounted in said fitting, said plug having an opening in one side thereof positioned to register with the aperture in said fitting when the plug is turned in one direction, one of the apertures of said apertured members communicating with a helically arranged groove formed therein, means for limiting the movement of said plug in opposite directions, a mixing chamber mounted on said fitting inclosing the discharge end of said plug and having an air inlet opening, and a shutter for controlling said inlet opening operable by movement of said plug.

2. The combination of a gas supply pipe, a tubular fitting secured to one end thereof with the bore of said fitting extending in a plane at right angles to the bore of said pipe, said fitting having an aperture in one side wall communicating with the bore of said pipe, a hollow rotary valve plug mounted in said fitting and having an opening in one wall thereof positioned to register with the aperture in said fitting when said plug is turned in one direction, the outer face of said plug having a helically arranged groove extending from the aperture therein and gradually decreasing in depth toward its outer end to provide for the gradual cutting off and turning on of the gas, a needle valve operable in said plug for controlling the passage of gas therethrough, a mixing chamber mounted on said fitting and inclosing the discharge end of said plug, said chamber having an air inlet opening, and a shutter carried by said plug to vary the size of the opening in said chamber.

3. The combination of a gas supply pipe, a tubular fitting secured to one end thereof with the bore of said fitting extending in a plane at right angles to the bore of said pipe, said fitting having an aperture in one side wall communicating with the bore of said pipe, a hollow rotary valve plug mounted in said fitting and having an aperture in one wall thereof positioned to register with the opening in said fitting when said plug is turned in one direction, the outer face of said plug having a helically arranged groove extending from the aperture therein to provide for the gradual cutting off and turning on of the gas, a needle valve operable in said plug for controlling the passage of gas therethrough, a mixing chamber mounted on said fitting and inclosing the discharge end of said plug, said chamber having an air inlet opening, a shutter carried by said plug to vary the size of the opening in said chamber, and coöperating means carried by said plug and fitting for limiting the turning of the plug in opposite directions.

4. A combined air and gas controlling valve including a tubular fitting, a rotary gas supply valve mounted in said fitting, a mixing chamber mounted on said fitting and inclosing the discharge end of said valve, said chamber having an opening in one end, a shutter for varying the size of said opening, said shutter having a collar mounted on said rotary valve, said collar having an obliquely disposed slot therein, and a pin on said valve engaged with said slot and operable to move said shutter toward and away from the opening in said mixing chamber on the turning of the valve in opposite directions.

In testimony whereof I have hereunto set my hand in presence of two subscribing witnesses.

JAMES W. ASHBAUGH.

Witnesses:
 M. V. RICKET,
 EUNICE PATCH.